United States Patent
Wang et al.

(10) Patent No.: US 6,915,025 B2
(45) Date of Patent: Jul. 5, 2005

(54) AUTOMATIC IMAGE ORIENTATION DETECTION BASED ON CLASSIFICATION OF LOW-LEVEL IMAGE FEATURES

(75) Inventors: Yongmei Wang, Hong Kong (HK); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 781 days.

(21) Appl. No.: 09/995,431

(22) Filed: Nov. 27, 2001

(65) Prior Publication Data

US 2003/0099395 A1 May 29, 2003

(51) Int. Cl.[7] ................................................. G06K 9/36
(52) U.S. Cl. ........................ 382/289; 382/165; 382/190
(58) Field of Search ............................... 382/159, 162, 382/165, 190, 203, 224, 228, 289; 702/150, 153

(56) References Cited

U.S. PATENT DOCUMENTS

| | | | | | |
|---|---|---|---|---|---|
| 3,636,513 | A | * | 1/1972 | Tisdale | 382/224 |
| 4,748,676 | A | * | 5/1988 | Miyagawa et al. | 382/289 |
| 5,842,194 | A | * | 11/1998 | Arbuckle | 382/224 |
| 6,055,326 | A | * | 4/2000 | Chang et al. | 382/289 |
| 6,816,847 | B1 | * | 11/2004 | Toyama | 382/159 |

* cited by examiner

*Primary Examiner*—Phuoc Tran
(74) *Attorney, Agent, or Firm*—Lee & Hayes, PLLC

(57) ABSTRACT

The described arrangements and procedures identify an image's orientation by extracting features from peripheral portions of the image. The procedure evaluates the extracted features based on training image feature orientation classification models to identify the image's orientation.

34 Claims, 9 Drawing Sheets

Rotation = 0°
100

Rotation = 90°
200

Rotation = 180°
300

Rotation = 270°
400

Image Divided into N x N Sub-Blocks
500

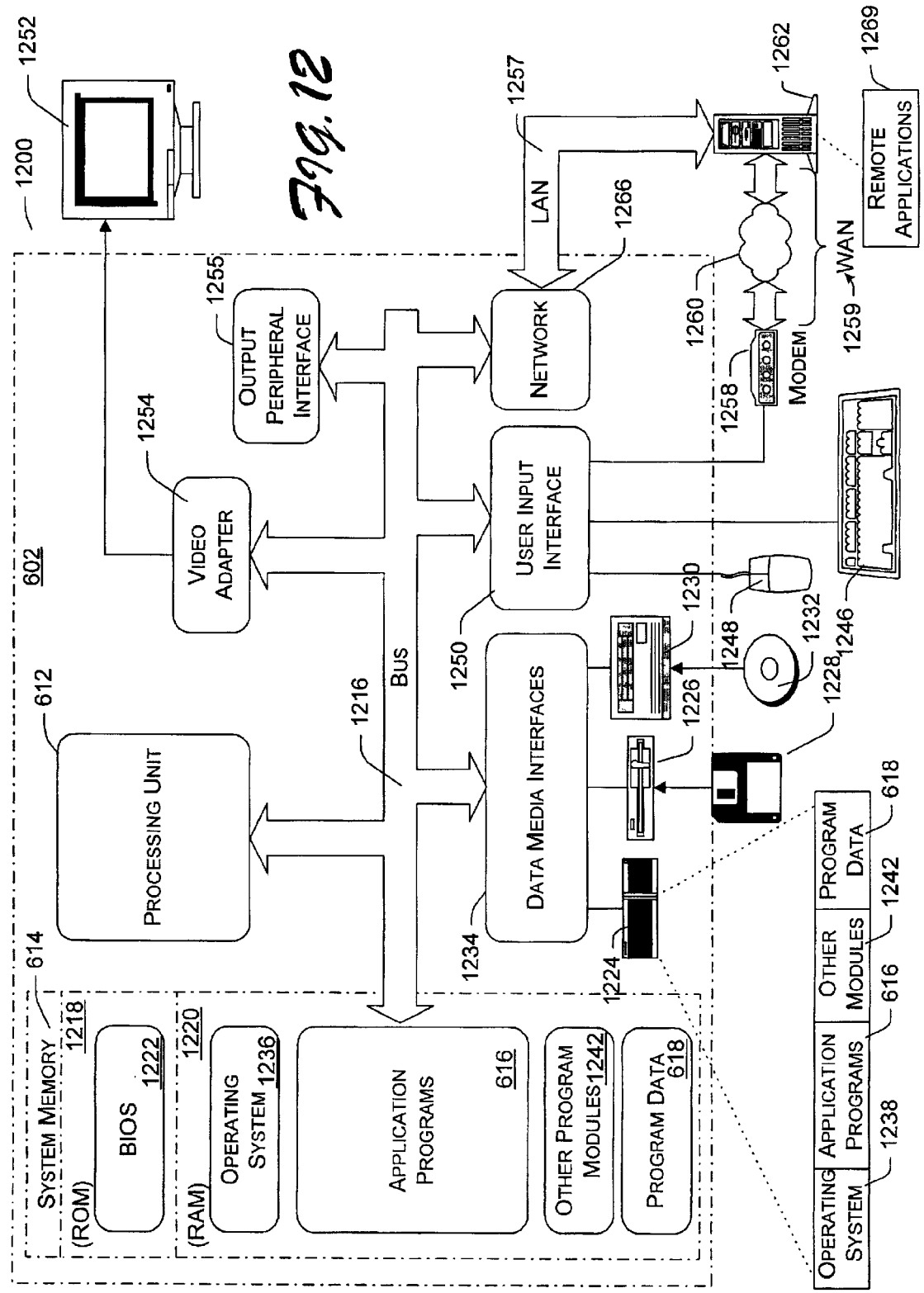

US 6,915,025 B2

AUTOMATIC IMAGE ORIENTATION DETECTION BASED ON CLASSIFICATION OF LOW-LEVEL IMAGE FEATURES

TECHNICAL FIELD

The following description relates to image processing. More particularly, the described arrangements and procedures pertain to determining correct image orientation through classification of image features.

BACKGROUND

With the rapid development of multimedia and Internet technologies, accurate image orientation detection is of great importance. Correct orientations of digitized or scanned images in an image library or database must be determined for their proper display. Traditional deskewing techniques are substantially limited. The following arrangements and procedures address the limitations of traditional image orientation detection techniques.

SUMMARY

The described arrangements and procedures identify an image's orientation by extracting features from peripheral portions of the image. The procedure evaluates the extracted features based on training image feature orientation classification models to identify the image's orientation.

BRIEF DESCRIPTION OF THE DRAWINGS

The same numbers are used throughout the drawings to reference like features and components.

FIG. 8 illustrates a static combination perspective on the training and classification aspects of the image orientation determination module.

FIG. 9 shows further aspects of data flow within and between the classification module and the combiner module, wherein static or averaging combiner logic is used to provide determined image orientation.

FIG. 10 shows logic of the orientation detection module that is configured to provide hierarchical trainable classifier combinations.

FIG. 12 shows an example of a suitable computing environment on which an exemplary system and procedure to determine image orientation based on the classification of image features may be implemented.

DETAILED DESCRIPTION

Figure 1:
FIG. 1 shows an image that is rotated 0° from its correct orientation.
Figure 2:
FIG. 2 shows an image that is rotated 90° from its correct orientation.

The following description sets forth exemplary subject matter to determine correct image orientation based on image content features. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Overview

Conventional image orientation techniques rely on learning algorithms (i.e., a Bayesian learning framework) to classify image orientations according to color extracted from the images. The color feature represents the chrominance information. However, color or chrominance is typically not discriminative enough of a feature in and of itself for accurate image orientation detection. This is because proper image orientation often can typically only be determined with additional visual information such as contextual information or object recognition to provide a proper context to the detected colors.

In contrast to such conventional techniques, the described arrangements and procedures use additional information such as statistical pattern classification techniques in combination with complimentary low-level image features for robust image orientation detection. For instance, classifiers such as Support Vector Machine (SVM) classifiers are used to construct predictive image orientation models from the extracted image features (e.g., low-level image features) of a number of training images. Extracted image features include luminance (i.e., structural) and chrominance (i.e., color moment) features of an image. Luminance or structural image features include texture and shape (e.g., edge-based structural features). A number of detected image orientation rejection features (i.e., regular and reinforced ambiguity rejections) are employed to filter-out images with low confidence values during image orientation classification.

Image Orientation

Proper or correct orientation of an image is considered to be the natural orientation of the scene captured by the digital image. Camera rotation while taking a picture or misplacement of a photograph on a scanner can cause improper digital image orientation. For instance, when pictures are placed on a scanner platen, their respective boundaries are typically aligned with those of the scanner platen. In this example, a scanned image will have one of four possible rotations, each of which is a multiple of ninety degrees (90°). That is a digitized or scanned photograph will differ from its correct orientation by zero degrees (0°), 90°, one-hundred and eighty degrees (180°), or two-hundred and seventy degrees (270°). Thus, the image orientation detection problem can be organized as a four-class classification problem: with $\omega^1=0°$, $\omega^2=90°$, $\omega^3=180°$, and $\omega^4=270°$.

FIGS. 1–4 show four possible classification orientations of an image. Specifically, FIG. 1 shows an image that is rotated 0° from its correct orientation. That is, the image's correct orientation is represented by $\omega^1$=Rotation=0°. FIG.

Figure 3:
FIG. 3 shows an image that is rotated 180° from its correct orientation.
Figure 4:
FIG. 4 shows an image that is rotated 270° from its correct orientation.

2 shows an image that is rotated 90° from its correct orientation. FIG. 3 shows an image that is rotated 180° from its correct orientation. FIG. 4 shows an image that is rotated 270° from its correct orientation.

Feature Extraction

The described arrangements and procedures use visual content of an image to determine appropriate image orientation detection. Local or regional features of the image are identified to provide spatial context for classifying an image based on one of a number of possible image orientations. To determine these regional features, the image is divided into N×N sub-blocks, wherein each sub-block represents a respective region. At least a portion of these regions (i.e., at least a portion of the N×N sub-blocks) are used to determine the images appropriate orientation.

The number of sub-blocks or localized regions to divide an image into is determined based on a balance of a number of different criteria. For instance, as the number of localized regions ($N^2$) increases from one (1) to some number (the particular number being a function of image feature complexity and/or image type (e.g., landscape, cityscape, portrait, etc.)), image orientation classification accuracy improves.

However, as the number of localized regions increase (i.e., an increase in feature vector size), the complexity of the classifier (e.g., the SVM-based classifier) also increases as do a system's computation processing requirements. As N increases, the classifier (trained on a finite number of samples) eventually becomes so complex that its orientation detection performance begins to decrease. Thus, as N increases from (1) to some number image orientation detection improves, and increases in N beyond that number typically result in decreased classification and system performance.

Accordingly, there is a trade-off between image orientation algorithm complexity and performance and N is selected as a function of this trade-off (e.g., based on image feature complexity, image type, the number of samples used to train the classifier, system performance requirements, and so on) as discussed in greater detail below.

Chrominance: Color Moments (CM)

Color moments (CM) of an image in International Commission on Illumination (i.e., Commission Internationale de l'Eclairage—CIE) LUV color space are very effective for color-based image analysis. First order color moments (i.e., mean color) and the second order moments (i.e., color variance) are used to identify image chrominance or CM information. Note that within each N×N sub-block, the CM vector is normalized such that the sum of each component's square is one.

Figure 5:
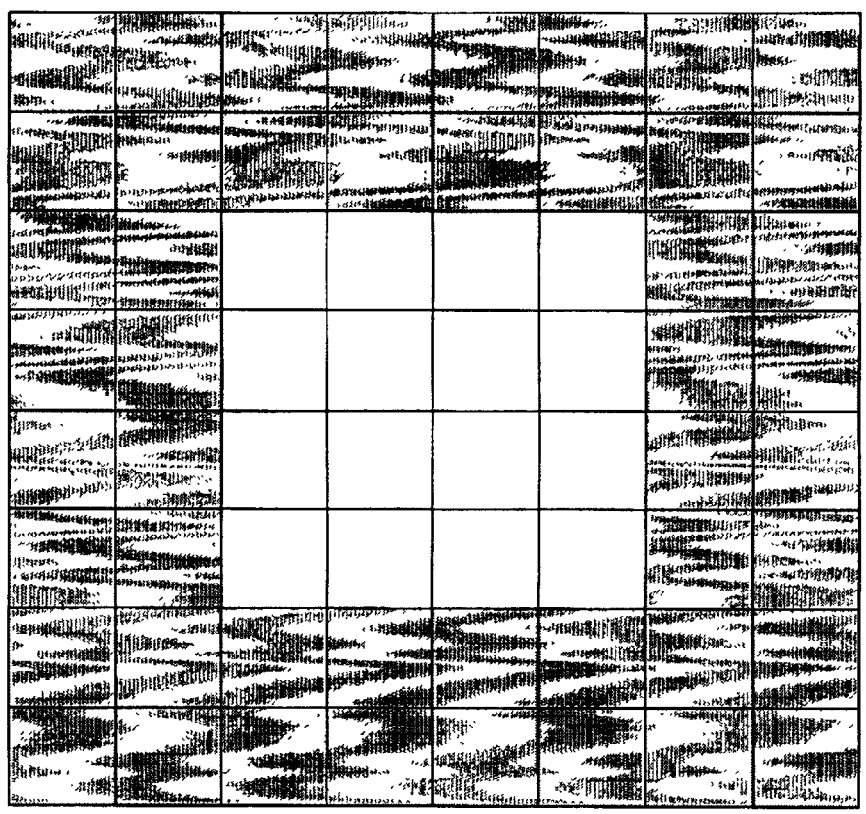
FIG. 5 shows an image that has been divided onto N×N sub-blocks.

FIG. 5 shows an image 500 that has been divided onto N×N sub-blocks. Specifically, the image has been divided into 8×8 sub-blocks. Color moments (CMs) for peripheral sub-blocks (e.g., the peripheral gray blocks) of the N×N sub-blocks of image 500 are determined. The peripheral sub-blocks (i.e., the gray peripheral blocks) typically include color information that is useful for image orientation detection. This is because the images' periphery typically embeds such information. The images' central portion (e.g., the white blocks of image 500) generally does not contain color information that is very useful for image orientation determinations.

During the learning process, calculating CM features only over peripheral sub-blocks facilitates in the efficient capture the boundary symmetry property of an image 500. This makes image orientation rejection criterion more effective. Specifically, incorporation of redundant or less effective image 500 features (e.g., features represented in the central portion of the image—the white blocks) will generally degrade the described image classification performance and increase feature dimension, thereby increasing overall system complexity.

In this example, the CM feature vector size is determined to be equivalent to forty-eight (48) periphery blocks*six (6) CM features, the product of which represents a vector with two-hundred and eighty-eight (288) features (i.e., 48*6= 288). The six (6) CM features correspond to the three (3) mean and 3 variance values of the CIE LUV components that are extracted from each sub-block of the images' periphery.

Although essential color information for orientation detection is typically embedded in the periphery of an image, essential color information may also be embedded in other portions of the image 500 (i.e., the more central portions of the image) depending on the subject matter of the image. Thus, just as the number of N×N sub-blocks used to sub-divide an image can be adjusted based on the learning process, the subject matter of an image, desired I/O performance, and so on, the number of rows and columns of sub-blocks identifying an image's periphery is also configurable. Accordingly, the actual number of rows and columns of sub-blocks that identify an image's periphery can be any number of rows and columns of sub-blocks—including all sub-blocks of the image.

Luminance: Edge Direction Histogram (EDH)

Edge-based structural features are employed to capture the luminance information carried by an edge map of an image. Specifically, an edge direction histogram (EDH) is generated and evaluated to characterize image structural and texture information. An edge detector extracts the edges in the image.

The edge direction histogram is represented with a number of bins. The first 36 bins represent the count of edge points with edge directions quantized at 10° intervals. The last bin represents the count of the number of pixels that do not contribute to an edge. To compensate for different image sizes, the histograms are normalized as follows:

$H(i)=H(i)/M_e$, for $i \in [0, \ldots, 35]$; and $H(36)=(H(36)/M,$ where H(i) is the count in bin i of the edge direction histogram; $M_e$ is the total number of edge points detected in the sub-block of an image; and M is the total number of pixels in the sub-block.

EDH feature vector calculation is determined with respect to each of a number of sub-blocks of the image. This number of sub-blocks is not necessarily the same number of sub-blocks that the image was divided into for CM determinations.

Additionally, EDHI determinations are performed with respect to each sub-block in the image, not only with respect to a subset of the N×N blocks that represent the periphery of the image. The trade-off between the algorithm complexity and performance described above is also true here for a specific N.

In this example, the image is divided into five ($52^2$) sub-blocks empirically for EDH feature vector calculation. Therefore, for each image, the EDH vector size is: twenty-five (25) blocks*thirty-seven (37)=nine-hundred and twenty-five (925) vectors.

Feature Normalization Over Training Images

Both the above CM and EDH vectors are normalized within each sub-block of the image. To accommodate scale differences over various images during feature extraction, all extracted features are also normalized over training examples to the same scale. The scaled i-th feature component, $x_i'$ of a feature vector x is calculated as:

$$x_i' = \frac{x_i - \min i}{\max_i - \min i},$$

where $\min_i$ and $\max_i$ represent the range of the i-th feature component, $x_i$, of x over the training samples.

Support Vector Machine (SVM) Based Systems

SVMs are statistical learning systems that are based on statistical learning theory. For instance, the SVM introduced by V. Vapnik in "Statistical Learning Theory", New York: John Wiley & Sons, 1998, which is hereby incorporated by reference, is a powerful learning algorithm. An SVM is primarily a two-class classifier. The optimization criterion is the width of the margin between the positive and negative examples. An SVM with a large margin separating two classes has a small Vapnik Chervionenkis (VC) dimension. This small VC dimension yields a good generalization performance, which has also been demonstrated in some applications, such as face detection. Since the described arrangements and procedures automatically detect respective orientations of a large variety of images, good generalization of performance over image variety is a desired property.

SVM multi-class pattern recognition problems (i.e., problems with more than two (2) classes) are typically solved by using voting scheme methods based on combining many binary classification decision functions with either one-against-all or one-against-one schemes.

For instance, in a one against-all scheme, k classifiers are placed in parallel, one classifier corresponding to each class. The k-th classifier constructs a hyper-plane between class k and the k-1 other classes. The variable k represents the number of classes to be classified, which is decided by the respective problem. For example, k can represent any number of possible image orientation classifications such as classifications between 0°, 90°, 180°, 270°. In the described four-class orientation (i.e., 0°, 90°, 180°, 270°) detection problem k equals four. A new input is classified by choosing the maximum of the outputs of k SVMs. For example, in the described image orientation detection algorithms, the image is classified into class $\omega_i$ (i=1, 2, 3, 4) if $f_i \geq f_j$, $\forall j \neq i$. There are a number of known extensions to the SVM method of pattern recognition to solve k-class problems in one (formal) step, which do not use a combination of binary classification rules. Here, we use the one-against-all SVM-based classifiers for image orientation determination.

An Exemplary System

Figure 6:
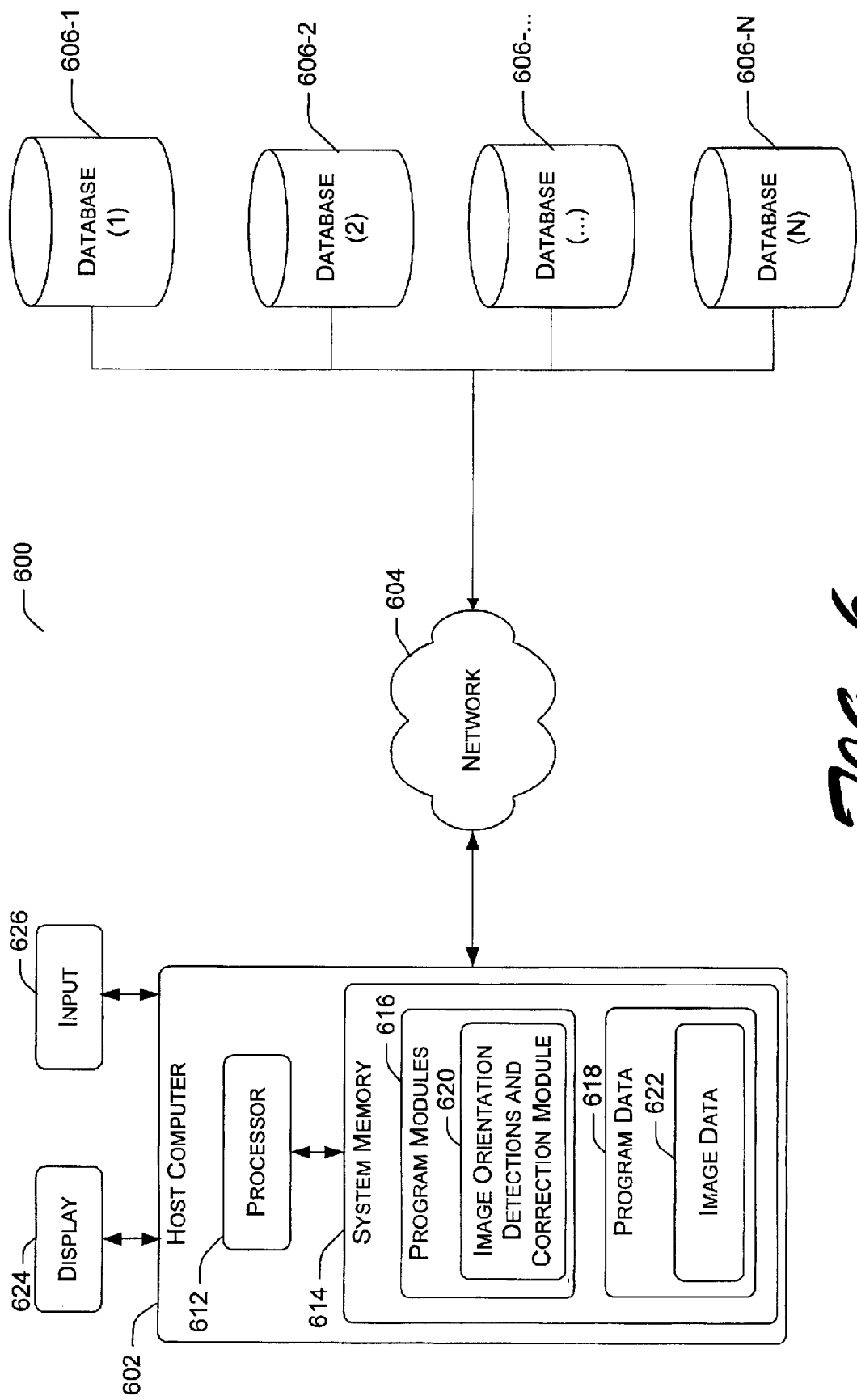
FIG. 6 shows an exemplary system to determine correct image orientation based on image features.

FIG. 6 shows an exemplary system 600 to determine correct image orientation based on image features. The system includes a host computer 602 that optionally coupled across a communications medium 604 to one or more image databases 606. The host computer 602 is operational as any one of a number of different computing devices such as a personal computer, an image server computer, a thin client, a thick client, a hand-held or laptop device, a multiprocessor system, a microprocessor-based system, a set top box, programmable consumer electronics, a wireless phone, an application specific integrated circuit (ASIC), a network PC, minicomputer, mainframe computer, and so on.

The host computer includes a processor 612 that is coupled to a system memory 614. The system memory 614 includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory-card, a CD-ROM, and so on.

The processor 612 is configured to fetch and execute computer program instructions from program modules 616; and configured to fetch data 618 while executing the program modules 616. Program modules typically include routines, programs, objects, components, data structures, etc., for performing particular tasks or implementing particular abstract data types. For instance, program modules 616 includes image orientation detection module 620 for detecting correct image orientation based on image content, and other applications (e.g., an operating system, a Web browser application, and so on).

The host device 602 is optionally operatively coupled to a display device 624 (e.g., a CRT, flat-panel monitor, etc.) to display images in various image orientations from image data 622.

The optional communication medium 604 is any combination of a parallel connection, a packet switched network (e.g., an organizational intranet network), the Internet, or other communication configurations that provide electronic exchange of information between the host device 602 and the image databases 606 using an appropriate protocol (e.g., TCP/IP, UDP, SOAP, etc.).

An image database 606 is an object-oriented database such as an Extensible Markup Language (XML) database, a Hypertext Markup Language (HTML) database, an SQL server database, and so on, for storing image data for host device 602 input and output (I/O) accesses.

Other system arrangements are possible including additional host devices 602, more or less image databases 608, and so on. For instance, the host device 602 can operate as an image server to correctly orient images 622 before communicating them to other computers (not shown) coupled to the network 604, and/or before storing correctly oriented images in a memory such as system memory 614 or across one or more databases 606.

An Exemplary Image Orientation Detection Module Architecture

Figure 7:
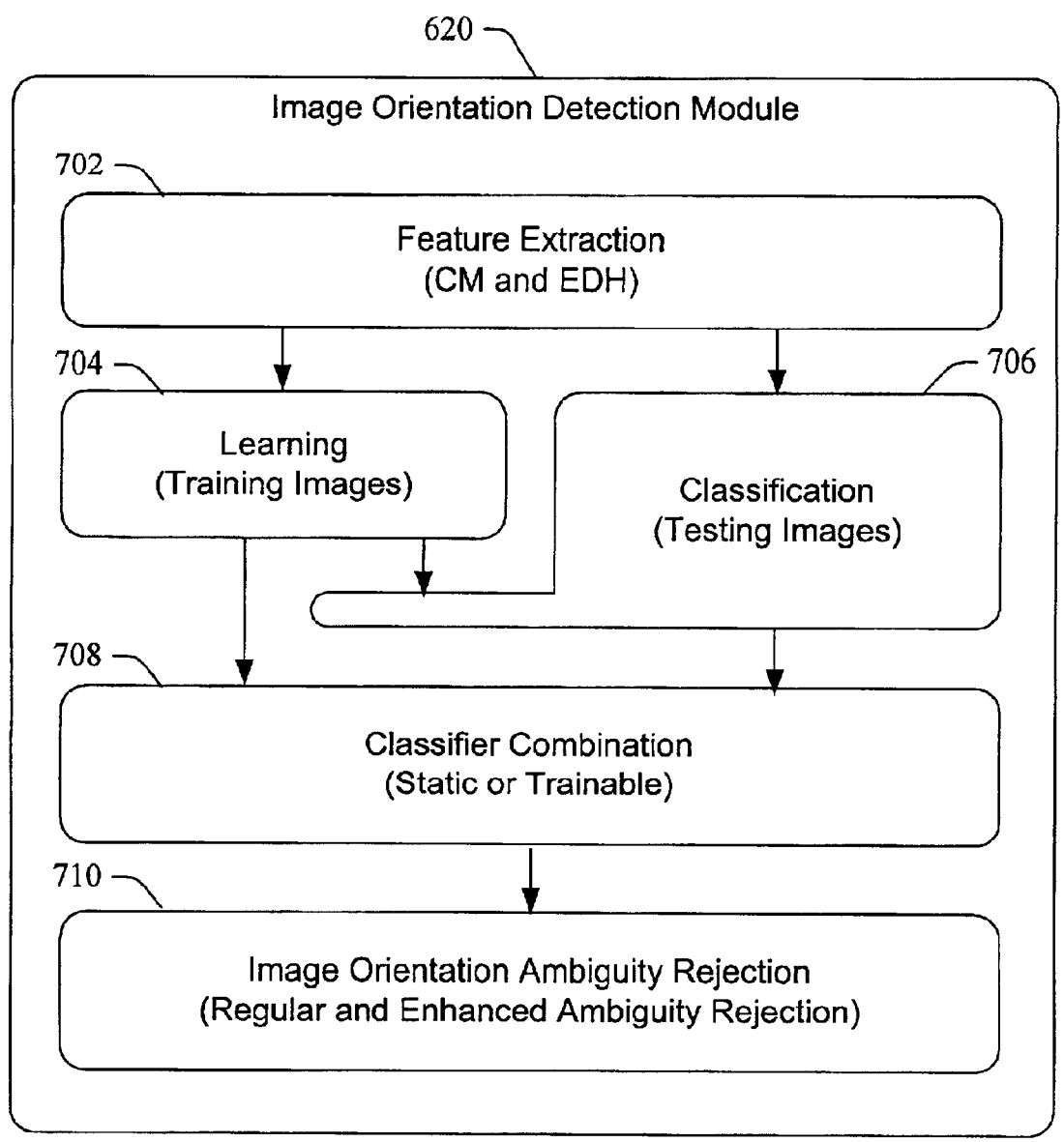
FIG. 7 shows an exemplary architecture for the image orientation detection module of FIG. 6. Specifically, the module's architecture uses both training (i.e., learning) and classification (i.e., testing) models with respect to a classifier combination (e.g., averaging or hierarchically trainable combiners) to determine correct image orientation.

FIG. 7 shows an exemplary architecture for the image orientation detection module 620 of FIG. 6. Specifically, the module's 620 architecture uses both training (i.e., learning) and classification (i.e., testing) models with respect to a classifier combination (e.g., averaging or hierarchically trainable combiners) to determine correct image orientation. This architecture includes an image feature extraction module 702, an SVM based learning module 704, an SVM based classification module 706, a classifier combiner or combination module 708, and an image orientation rejection module 710. Data flows between the respective modules 702 through 710 are represented by vertical lines connecting the modules.

The image feature extraction module 702 extracts both CM and EDH image features. If the system 600 is being trained to detect image orientations of certain classes of image, the images are training images; otherwise the images are classification or testing images. Techniques for extracting CM and EDH image features are discussed above.

Extracted CM and EDH features from training or learning images are communicated to the classifier-based learning module 704. Because different sources of feature sets are used (i.e., CM and EDH features) and because of the binary classification nature of the employed classifiers (e.g., in this example SVM-based classifiers), multiple classifiers are combined to determine appropriate image orientation. In this example, the classifier-based learning module 704 includes a number of one-against-all classifiers—one pair of classifiers (e.g., SVMs) for each possible orientation of interest. One classifier of each classifier pair is for the CM training image features; and the other classifier of the classifier pair is for the EDH training image features. With respect to the orientations of interest, in this example, the orientations of interest include $\omega^1=0°$, $\omega^2=90°$, $\omega^3=180°$, and $\omega^4=270°$. Thus, there are four classifier pairs or eight parallel classifiers in the learning module 704.

CM and EDH features from classification or testing images are communicated by the feature extraction module 702 to the classifier-based classification module 706. Similar to the learning module 704, the classification module 706 includes a number of one-against-all classifiers (e.g., SVM classifiers)—one pair of classifiers for each possible orientation of interest. One classifier of each classifier pair is for the CM testing image features; and the other classifier of the classifier pair is for the EDH testing image features. With respect to the orientations of interest, in this example, the orientations of interest include $\omega^1=0°$, $\omega^2=90°$, $\omega^3=180°$, and $\omega^4=270°$. Thus, there are four classifier pairs or eight parallel classifiers in the classifier-based learning module 704.

The classifiers in the classification module 706 use the results from the learning module 704 to determine correct test image orientations. During the learning process, output of each classifier is a respective learning model, including the trained support vectors (selected feature vectors from the original feature vectors). These support vectors are then utilized in the respective classification combination module 708, whose output is a numerical number corresponding to image orientation.

For instance, the results of learning module 704 are eight models—four CM models (one CM model for each possible orientation) and four EDH models (one EDH model for each possible orientation). Each model is then incorporated into the respective classification in module 706. For example, CM model for orientation 0° is employed in the CM-based orientation 0° SVM classification, and the output of this classification is a numerical number. Therefore, the results of the classification module 706 are eight numerical numbers corresponding to image orientation.

The classifier combining module 708, in this example, provides a static (i.e., linear) or trainable combination of the classifier (e.g., SVM) derived outputs for each orientation. A static combiner averages the outputs from the classifier-based classification module 706. Specifically, these are eight total outputs (i.e., two outputs for each CM and EDH features for each possible orientation—in this case there are four possible orientations). A trainable classifier combiner 708 is one wherein outputs from one or more classifier-based learning modules 704 in combination with one or more classifier-based classification modules are used to determine possible image orientations. An example of an image orientation detection module 620 configured with a trainable classifier combiner 708 is described in greater detail below in reference to FIG. 10.

Regardless of whether the classification combination module 708 uses a static or a trainable combiner algorithm, the image is classified into an orientation class of $\omega^i$ (i=1, 2, 3, or 4), wherein $\omega^1=0°$, $\omega^2=90°$, $\omega^3=180°$, and $\omega^4=270°$. Specifically, the image is classified into an orientation class of $\omega^i$ (i=1, 2, 3, or 4) if: (a) $f_i \geq f_j$, $\forall j \neq i$; (b) $f_i \geq 0$; (c) $f_i - f_j \geq t$, $\forall j \neq i$, where t represents the threshold for ambiguity rejection; $f_i$ (for i=1, 2, 3, 4) is the final output after classifier combination; and j=1, 2, 3, or 4.

For instance, suppose $f_1=0.9$, $f_2=0.1$, $f_3=0.2$, $f_4=0.6$, then, this image will be classified to $\omega^1$ if t is chosen as $\leq 0.3$ since all the described conditions (condition (a), (b), and (c)) are satisfied, and this image will be rejected if t is chosen as >0.3. The higher the threshold, the more images that are rejected by the algorithm. Thus, the particular ambiguity threshold used is a function of orientation detection accuracy results, which in turn may be a function of the complexity of the classifier (e.g., the feature vector size, the image type (e.g., landscape, portrait, crowds, etc), and so on). Hereinafter, equations (a), (b), and (c) are often referred to as the orientation class equations.

The image orientation rejection module 710 uses a number of procedures (i.e. regular and enhanced ambiguity rejection algorithms) to determines if the identified image orientation $\omega^i$ (i=1, 2, 3, or 4) indication is ambiguous. For instance, regular ambiguity rejection is based on whether orientation class equations (b) or (c) are satisfied; if not, the determined image orientation is rejected. The goal of this regular ambiguity rejection is to improve the classification accuracy by rejecting outliers and patterns for which the classifier has a low confidence. In other words, an image orientation decision will not be made with respect to the image if the algorithm does not have high confidence on the image orientation detection result. This significantly reduces the number of incorrect image orientation determinations.

Enhanced ambiguity rejection is a re-enforced rejection scheme wherein a received classification image is duplicated into first and second copies. The first copy is unaltered. The second copy is rotated some number of degrees (e.g., 180°) from the original orientation (i.e., the orientation within which it was presented to system 600). Both the first and second images are put into the image orientation determination pipeline (i.e., modules 702 through 710; results from either a static or trainable classifier can be used).

Regular ambiguity rejection criterion of module 710 is used for both the first (original) and second (rotated) images. The final orientation of the first or original image is decided by considering the results for both the original and the rotated images. In this way, additional consistent information is captured by the feature vectors (i.e., the CM and EDH vectors generated by the feature extraction module 702). This additional information enhances or reinforces the regular ambiguity rejection criterion to provide enhanced image orientation determinations.

Static Classifier Combinations

Figure 8:
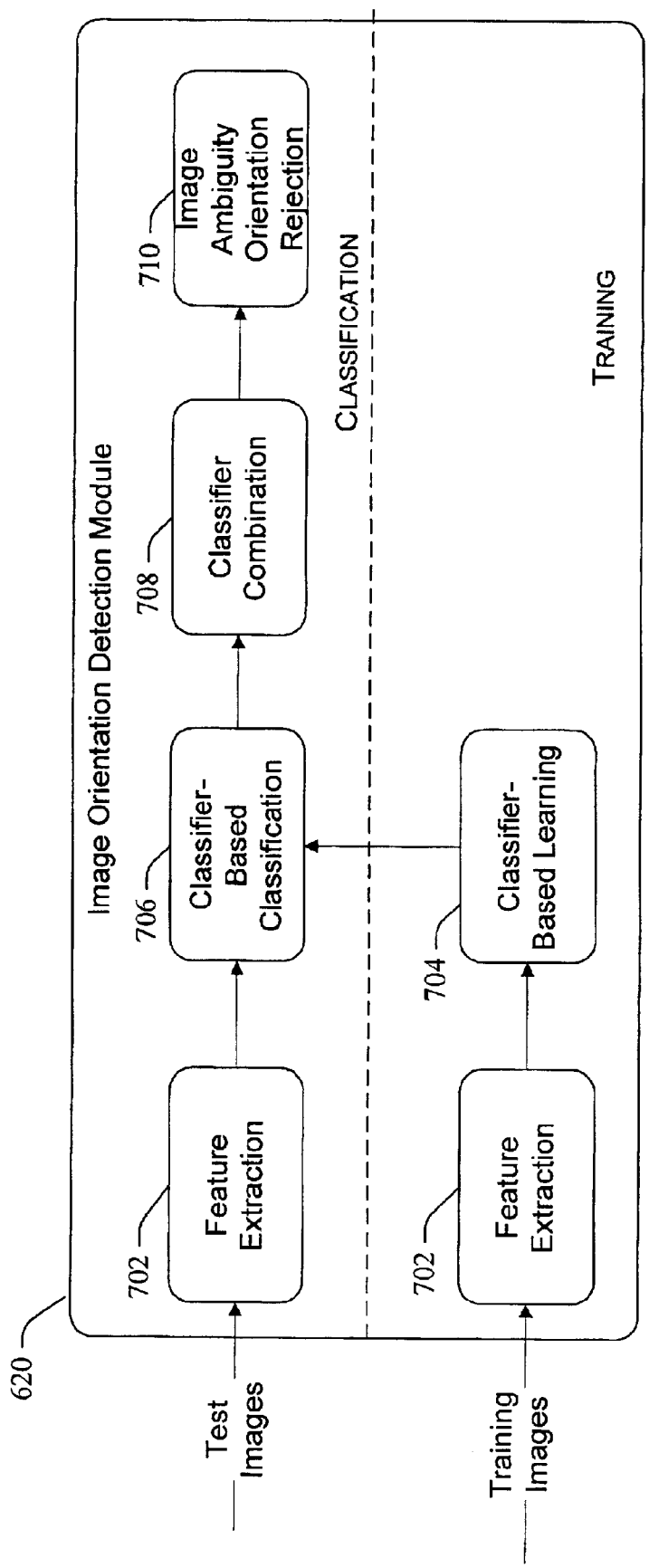
FIG. 8 shows further aspects of the image orientation detection module of FIG. 6. Specifically.

FIG. 8 shows further aspects of the image orientation detection module 620. Specifically, FIG. 8 illustrates a static combination perspective on the training and classification aspects of the image orientation determination module 620. The arrows between the modules are indicative of data flows. Note that in this architectural perspective, no training image data is being directly communicated from the classifier-based learning module 704 to the classifier combiner or combination module 708. Rather the training data is being first processed by the classifier-based classification module 706 where it is evaluated with respect to the features of the input test image(s). The classification module 706 results in two outputs (CM and EDH) for each possible image orientation based on the inputs from the learning module 704. These outputs are linearly averaged at the combiner module 708 to produce an image orientation determination.

Figure 9:
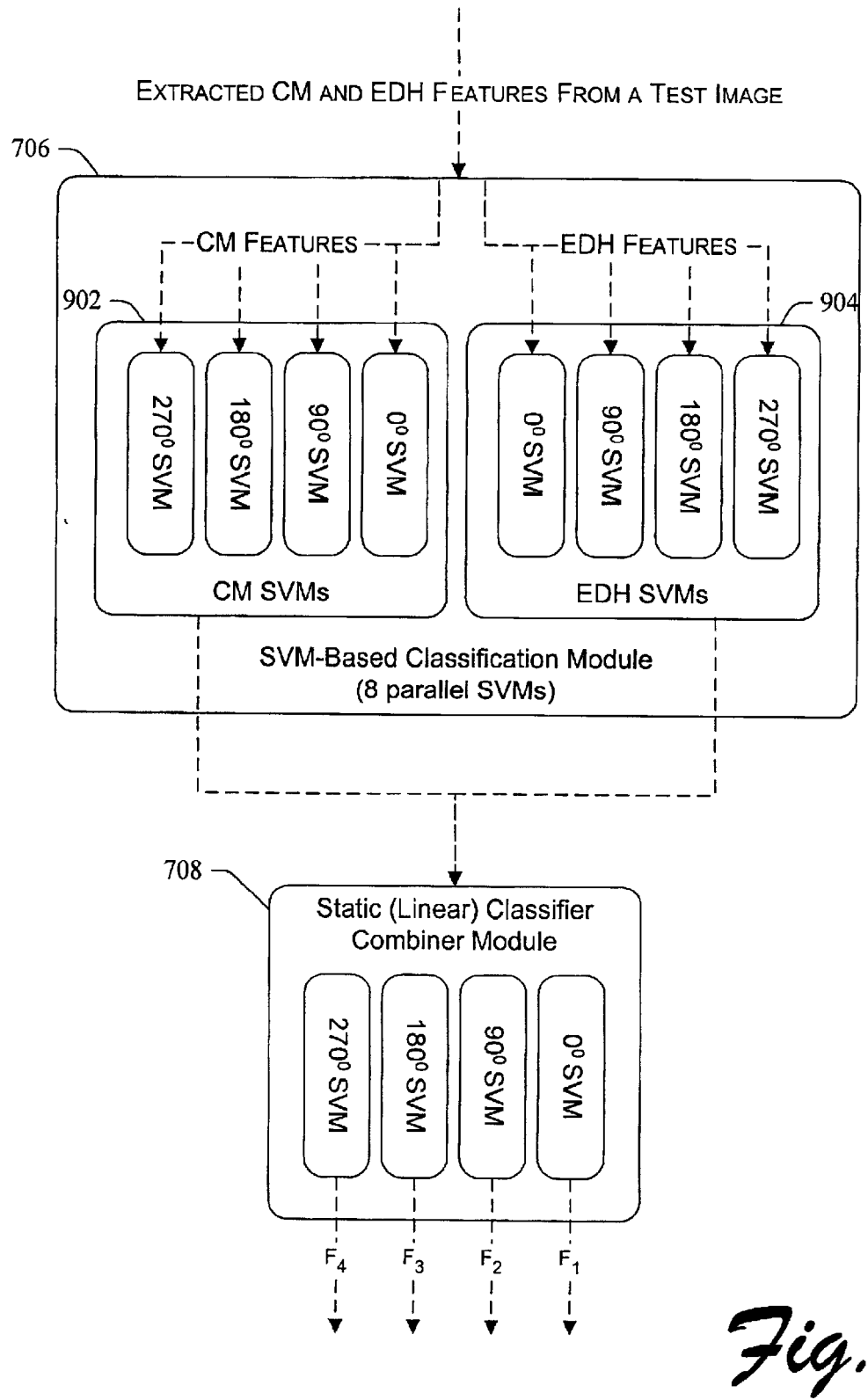
FIG. 9 shows further aspects of the image orientation detection module of FIG. 6. Specifically.

FIG. 9 shows further aspects of the image orientation detection module 620. Specifically, FIG. 9 shows further aspects of data flow within and between the classification module 706 of FIG. 7 and the combiner module 708, wherein static or averaging combiner logic is used to provide determined image orientation. Classifier-based classification module 706 includes one set of classifiers 902, which are used to receive and classify an images' CM features, and another set of classifier 904, which are used to receive and classify the images' EDH features. In this example, the classifiers are shown as SVM-based classifiers. CM SVMs 902 include a respective SVM for each possible orientation of interest (e.g., $\omega^1=0°$, $\omega^2=90°$, $\omega^3=180°$, and $\omega^4=270°$). EDH SVMs 904 include a respective SVM for each possible orientation of interest (e.g., $\omega^1=0°$, $\omega^2=90°$, $\omega^3=180°$, and $\omega^4=270°$). Accordingly, in this case, there are eight parallel SVMs to determine image orientation with respect to image semantics, which in this case are based on numerous CM and EDH calculations.

The results (i.e., the CM and EDH outputs) of SVM-based classification module 706 are communicated to the static combiner module 708, wherein the results are linearly combined and the image is classified into an orientation class of $\omega^i$ (i=1, 2, 3, or 4), wherein $\omega^1=0°$, $\omega^2=90°$, $\omega^3=180°$, and $\omega^4=270°$. Specifically, the image is classified into an orientation class of $\omega^i$ (i=1, 2, 3, or 4) if: (a) $f_i \geq f_j$, $\forall j \neq i$; (b) $f_i \geq 0$; (c) $f_i - f_j > t$, $\forall j \neq i$, where t represents the threshold for ambiguity rejection; $f_i$ (for i=1, 2, 3, 4) is the final output after classifier combination; and j=1, 2, 3, or 4.

If the system 600 uses a static combiner 708 that can not compensate for scale differences of parallel SVMs outputs (i.e., from classification module 706), the output of each SVM (see SVMs 902 and 904 of FIG. 9) is scaled based on a scaling factor defined as the mean over the data points (i.e., the low-level features). These scaled features are again estimated on the training set or on new testing image data before being communicated to the static combiner 708.

Hierarchical Trainable Classifier Combinations

Figure 10:
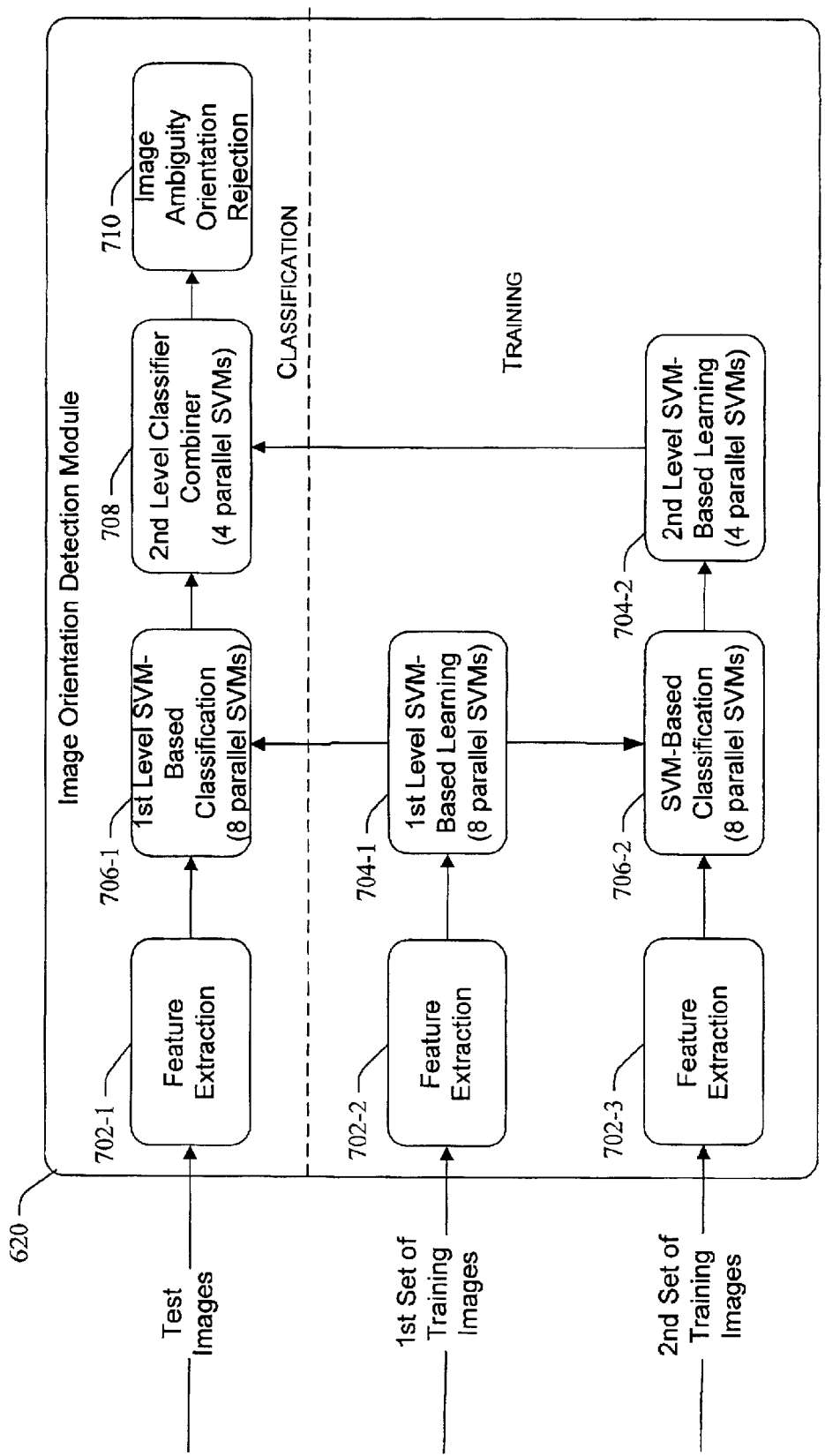
FIG. 10 shows further aspects of the image orientation detection module of FIG. 6. Specifically.

FIG. 10 shows further aspects of the image orientation detection module 620 of FIG. 6. Specifically, FIG. 10 shows logic of the orientation detection module that is configured to provide hierarchical trainable classifier combinations. The classification or testing aspects of this architecture are represented by modules 702-1, 706-1, 708, and 710. The training or learning aspects of this architecture are represented by modules 702-2, 702-3, 704-1 704-2, and 706-2. Arrows between respective modules indicate data flow between the modules.

In this exemplary architectural framework, the 1st layers of individual classifiers or SVMs are followed by 2nd layers of individual classifiers, whose inputs are the responses of the 1st layer classifiers. The 2nd level classifiers form a subsequent decision classifier layer. For instance, the eight respective classifiers of modules 706-1 and 706-2 are respectively followed by modules 708 and 704-2, each of which includes four respective classifiers. The four classifier (e.g., SVMs) at this layer are again placed in parallel and each one of them is trained to separate one orientation from the other three orientations.

For single layer classifier architecture of FIGS. 8 and 9, the image orientation decision is made purely based on the four output values. That is, the image is classified to the class having the largest f value, given that the orientation class conditions of equations (b) and (c) described above are satisfied, no matter what patterns or other relationships might exist between these outputs and the associated classes. On the other hand, a two layer classifier architecture of FIG. 10 takes both the largest and all the other three values, as well as the four outputs from the other feature based SVMs, into consideration through further statistical learning and training. The features used in the second layer classifier are the eight outputs from the first layer (eight) classifiers. The justification for this is that the responses of classifiers other than the winner classifier may also carry some useful information in determining proper image orientation. For these reasons, the use of additional training with more training data substantially improves image orientation recognition accuracy.

An Exemplary Procedure to Detect Image Orientation

Figure 11:
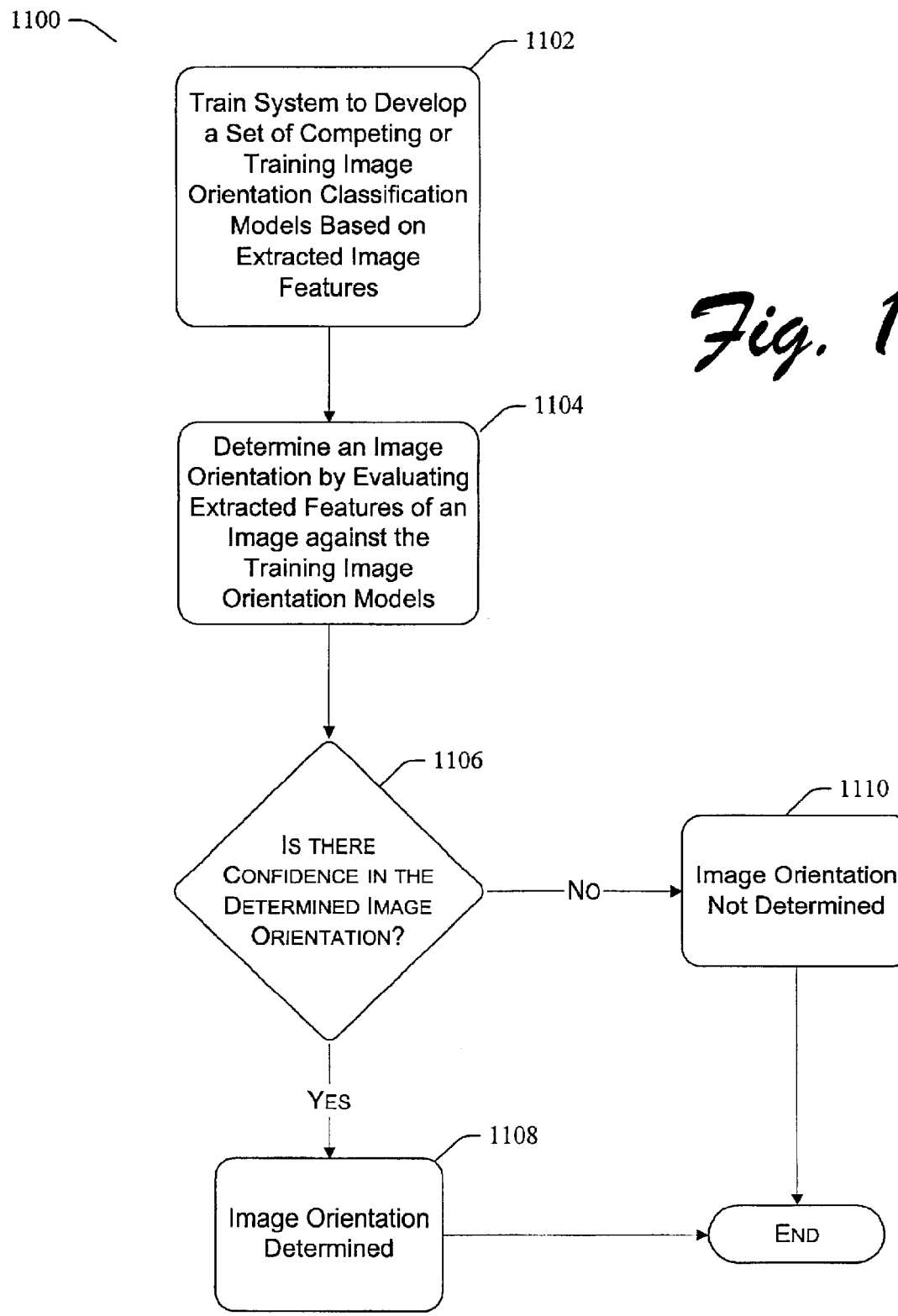
FIG. 11 shows an exemplary procedure that uses one-against-all Support Vector Machine (SVM) classifiers to determine correct image orientation.

FIG. 11 shows an exemplary procedure 1100 that uses one-against-all classifiers (e.g., SVM-based classifiers) to determine correct image orientation. Specifically, the procedure 1100 uses both training (i.e., learning) and classification (i.e., testing) models with respect to a static classifier combination (averaging) to determine correct image orientation. The image orientation detection and correction module 620 of FIG. 6 is configured to perform procedure 1100.

At block 1102, the system 600 is trained. This means that features (e.g., low-level features) of training or learning images are evaluated to develop a number of training image classification models. These features include chrominance and luminance image features. These features are extracted from the training images from sub-blocks of the image that statistically represent localized or regional areas with more essential color and/or structural information for orientation detection (e.g., from the images periphery). Statistical learning techniques, specifically those employed by classifiers are used to evaluate the extracted features and to develop predictive models of image orientation. In this example, the predictive models are constrained or evaluated within a limited number of possible orientations (e.g., 0°, 90°, 180°, and 270°), although the described arrangements and procedures can be used to constrain or evaluate the predictive models within other and/or additional orientations.

At block 1104, an images' orientation is classified or tested based not only on that particular images' extracted features, but also based on the competing or predictive image orientation models (block 1102) based on training images. The image features are extracted from sub-blocks of the testing image. These sub-blocks statistically represent areas with more essential color and/or structural information for orientation detection (e.g., peripheral sub-blocks rather that centrally located sub-blocks). Statistical learning techniques, specifically those employed by classifiers are used to evaluate the particular images' extracted features in view of these predictive models to determine low-level feature orientation. As with predictive model development, the classification of the feature correct orientation is determined with respect to a limited number of possible orientations (e.g., 0°, 90°, 180°, and 270°).

These feature orientations classifications are then combined either by averaging or in a hierarchically trainable manner. For instance, if the features are statically averaged (e.g., see FIG. 9), the chrominance and luminance features having the same orientation classification are averaged (e.g., CM and EDH classified as 90° are averaged, CM and EDH classified as 180° are averaged, and so on).

If the feature orientations classifications are combined in a hierarchical trainable manner (e.g., see FIG. 10), then any number of layers of predictive image orientation modeling (i.e., competing models) can be provided to the testing image classification layer. For instance, a first set of training images can be used to develop a first set of predictive modeling results. A second set of training images can be used to develop a second set of predictive modeling results based on the first predictive model (and so on). The first predictive model is utilized by the image feature classification module (e.g., module 706). The second predictive model is used by the combiner module (e.g., module 708). This technique typically provides additional robustness to the feature orientation determination.

At block 1106, the procedure 1100 determines if the identified image orientation indications is ambiguous. Either regular ambiguity rejection or re-enforced (i.e., enhanced) ambiguity rejection is used to determine whether there is sufficient confidence that the determined image orientation is the correct image orientation. (Regular and enhanced ambiguity rejection were discussed above).

Exemplary Computing Environment

FIG. 12 shows an example of a suitable computing environment 1200 on which an exemplary system and procedure to determine image orientation based on the classification of extracted image features may be implemented. Exemplary computing environment 1200 is only one example of a suitable computing environment and is not intended to suggest any limitation as to the scope of use or functionality of an exemplary system and procedure to cluster queries. The computing environment 1200 should not be interpreted as having any dependency or requirement relating to any one or combination of components illustrated in the exemplary computing environment 1200.

An exemplary system and procedure to determine correct image orientations may be described in the general context of computer-executable instructions, such as program modules, being executed by a computer. Generally, program modules include routines, programs, objects, components, data structures, etc., that perform particular tasks or implement particular abstract data types. An exemplary system and procedure to determine image orientation may also be practiced in distributed computing environments where tasks are performed by remote processing devices that are linked through a communications network. In a distributed computing environment, program modules may be located in both local and remote computer storage media including memory storage devices.

As shown in FIG. 12, the computing environment 1200 includes a general-purpose computing device in the form of a computer 602 of FIG. 6. The components of computer 602 may include, by are not limited to, one or more processors or processing units 612, a system memory 614, and a bus 1216 that couples various system components including the system memory 614 to the processor 612.

Bus 1216 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 602 typically includes a variety of computer-readable media. Such media may be any available media that is accessible by the computer 602, and it includes both volatile and non-volatile media, removable and non-removable media. For example, the system memory 614 includes computer readable media in the form of volatile memory, such as random access memory (RAM) 1220, and/or non-volatile memory, such as read only memory (ROM) 1218. A basic input/output system (BIOS) 1222, containing the basic routines that help to transfer information between elements within computer 602, such as during start-up, is stored in ROM 1218. RAM 1220 typically contains data and/or program modules that are immediately accessible to and/or presently be operated on by processor 612.

Computer 602 may further include other removable/non-removable, volatile/non-volatile computer storage media. By way of example only, FIG. 12 illustrates a hard disk drive 1224 for reading from and writing to a non-removable, non-volatile magnetic media (not shown and typically called a "hard drive"), a magnetic disk drive 1226 for reading from and writing to a removable, non-volatile magnetic disk 1228 (e.g., a "floppy disk"), and an optical disk drive 1230 for reading from or writing to a removable, non-volatile optical disk 1232 such as a CD-ROM, DVD-ROM or other optical media. The hard disk drive 1224, magnetic disk drive 1226, and optical disk drive 1230 are each connected to bus 1216 by one or more interfaces 1234.

The drives and their associated computer-readable media provide nonvolatile storage of computer readable instructions, data structures, program modules, and other data for computer 602. Although the exemplary environment described herein employs a hard disk, a removable magnetic disk 1228 and a removable optical disk 1232, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 1228, optical disk 1232, ROM 1218, or RAM 1220, including, by way of example, and not limitation, an OS 1238, one or more application programs 616, other program modules 1242, and program data 618. Each such OS 1238, one or more application programs 616 (e.g., image orientation detection module 620), other program modules 1242, and program data 618 (or some combination thereof) may include an embodiment of an exemplary system and procedure to determine correct image orientations.

A user may enter commands and information into computer 602 through input devices such as keyboard 1246 and pointing device 1248 (such as a "mouse"). Other input devices (not shown) may include a microphone, joystick, game pad, satellite dish, serial port, scanner, or the like. These and other input devices are connected to the processing unit 612 through a user input interface 1250 that is coupled to bus 1216, but may be connected by other interface and bus structures, such as a parallel port, game port, or a universal serial bus (USB).

A monitor 1252 or other type of display device is also connected to bus 1216 via an interface, such as a video adapter 1254. In addition to the monitor, personal computers typically include other peripheral output devices (not shown), such as speakers and printers, which may be connected through output peripheral interface 1255.

Computer 602 may operate in a networked environment using logical connections to one or more remote computers, such as a remote computer 1262. Logical connections shown in FIG. 12 are a local area network (LAN) 1257 and a general wide area network (WAN) 1259. Such networking environments are commonplace in offices, enterprise-wide computer networks, intranets, and the Internet. Remote computer 1262 may include many or all of the elements and features described herein relative to computer 602.

When used in a LAN networking environment, the computer 602 is connected to LAN 1257 via network interface or adapter 1266. When used in a WAN networking environment, the computer typically includes a modem 1258 or other means for establishing communications over the WAN 1259. The modem 1258, which may be internal or external, may be connected to the system bus 1216 via the user input interface 1250 or other appropriate mechanism.

Depicted in FIG. 12 is a specific implementation of a WAN via the Internet. Computer 602 typically includes a modem 1258 or other means for establishing communications over the Internet 1260. Modem 1258, which may be internal or external, is connected to bus 1216 via interface 1250.

In a networked environment, program modules depicted relative to the personal computer 602, or portions thereof, may be stored in a remote memory storage device. By way of example, and not limitation, FIG. 12 illustrates remote application programs 1269 as residing on a memory device of remote computer 1262. The network connections shown and described are exemplary and other means of establishing a communications link between the computers may be used.

Computer Readable Media

An implementation of exemplary subject matter to system and procedure to determine correct image orientations may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternative Embodiments

It is contemplated that alternative configurations of the systems and procedures may utilize: (a) semantic image classification (e.g., landscape, cityscape, portrait, etc.) before orientation detection; (b) incorporate user feedback; (c) provide additional recognition accuracy on rejected images through extra training; and (d) reduce feature dimension (i.e., the size of the feature vector) to increase system performance and improve image orientation classification accuracy.

As discussed above with respect to the complexity of the classifier, there are two main reasons to keep the feature dimensionality (i.e., the size of the feature vector) as small as possible: computation cost and classification accuracy. The utilization of the feature dimension reduction techniques, such as Principal Component Analysis (PCA) and Linear Discriminate Analysis (LDA), as well as the more recent methods, such as Independent Component Analysis (ICA) and Kernel PCA, may reduce the feature dimension.

CONCLUSION

The described arrangements and procedures provide for the combination of complimentary source information (i.e., chrominance color features and luminance edge-based structural features) that constitute low-level image features for effective orientation detection. Although the arrangements and systems to determine the image orientation have been described in language specific to structural features and methodological operations, it is to be understood that the arrangements and procedures as defined the appended claims are not necessarily limited to the specific features or operations described. Rather, the specific features and operations are disclosed as preferred forms of implementing the claimed subject matter.

What is claimed is:

1. A method to identify an image orientation, the method comprising:

extracting features from a periphery of an image;

evaluating the features based on training image feature orientation classification models; and responsive to evaluating the features, identifying an orientation of the image.

2. A method as recited in claim 1, wherein the features comprise chrominance and luminance features.

3. A method as recited in claim 1, wherein evaluating the features further comprises:

evaluating the orientation to determine a level of confidence in the orientation; and determining the orientation based on the level of confidence.

4. A method as recited in claim 1, wherein evaluating the features further comprises generating, by a plurality of classifiers, the training image feature orientation classification models using a plurality of training images.

5. A method as recited in claim 1, wherein evaluating the features further comprises generating, by a plurality of support vector machines, the training image feature orientation classification models using a plurality of training images.

6. A method as recited in claim 1, wherein the features comprise color moment and structural features, and wherein evaluating the features further comprises:

classifying, by a first plurality of classifiers, orientations of the color moment features with respect to each of a plurality of orientations to generate respective color moment confidence values for each orientation;

evaluating, by the first classifiers, orientations of the structural features with respect to each orientation to generate respective structural confidence values for each orientation;

for each orientation, combining, by a second plurality of classifiers, the color moment and structural confidence values that correspond to the orientation to generate a respective image orientation confidence value that corresponds to the orientation; and wherein the orientation is based on the respective image orientation confidence values.

7. A method as recited in claim 6, wherein the color moment and structural confidence values are combined with a static classifier.

8. A method as recited in claim 6, wherein the color moment and structural confidence values are combined with a hierarchically trainable classifier.

9. A computer-readable medium comprising computer-executable instructions to identify an image orientation, the computer-executable instructions comprising instructions for:
extracting features from a periphery of an image;
evaluating the features based on training image feature orientation classification models; and
responsive to evaluating the features, identifying an orientation of the image.

10. A computer-readable medium as recited in claim 9, wherein the features comprise chrominance and luminance features.

11. A computer-readable medium as recited in claim 9, wherein the instructions for evaluating the features further comprise instructions for:
evaluating the orientation to determine a level of confidence in the orientation; and
determining that the orientation is correct or incorrect based on the level of confidence.

12. A computer-readable medium as recited in claim 9, wherein the instructions for evaluating the features further comprise instructions for:
generating, by a plurality of classifiers, the training image feature orientation classification models using a plurality of training images.

13. A computer-readable medium as recited in claim 9, wherein the features comprise color moment and structural features, and wherein the instructions for evaluating the features further comprise instructions for:
classifying, by a first plurality of classifiers, orientations of the color moment features with respect to each of a plurality of orientations to generate respective color moment confidence values for each orientation;
evaluating, by the first classifiers, orientations of the structural features with respect to each orientation to generate respective structural confidence values for each orientation;
for each orientation, combining, by a second plurality of classifiers, the color moment and structural confidence values that correspond to the orientation to generate a respective image orientation confidence value that corresponds to the orientation; and
wherein the orientation is based on the respective image orientation confidence values.

14. A computer-readable medium as recited in claim 9, wherein the features comprise color moment and structural features, and wherein the instructions for evaluating the features further comprise instructions for:
classifying, by a first plurality of support vector machines, orientations of the color moment features with respect to each of a plurality of orientations to generate respective color moment confidence values for each orientation;
evaluating, by the first support vector machines, orientations of the structural features with respect to each orientation to generate respective structural confidence values for each orientation;
for each orientation, combining, by a second plurality of support vector machines, the color moment and structural confidence values that correspond to the orientation to generate a respective image orientation confidence value that corresponds to the orientation; and
wherein the orientation is based on the respective image orientation confidence values.

15. A computer-readable medium as recited in claim 13, wherein combining the color moment and structural confidence values further comprises combining the color moment and structural confidence values with a static classifier.

16. A computer-readable medium as recited in claim 13, wherein combiningment the color moment and structural confidence values further comprises combining the color moment and structural confidence values with a hierarchically trainable classifier.

17. A device to identify an image orientation, the device comprising:
a processor;
a memory coupled to the processor, the memory comprising computer-executable instructions, the processor being configured to fetch and execute the computer-executable instructions for:
extracting features from a periphery of an image;
evaluating the features based on training image feature orientation classification models; and
responsive to evaluating the features, identifying an orientation of the image.

18. A device as recited in claim 17, wherein the features comprise chrominance and luminance features.

19. A device as recited in claim 17, wherein the instructions for evaluating the features further comprise instructions for:
evaluating the orientation to determine a level of confidence in the orientation; and
determining that the orientation is correct or incorrect based on the level of confidence.

20. A device as recited in claim 17, wherein the instructions for evaluating the features further comprise instructions for generating, by a plurality of classifiers, the training image feature orientation classification models using a plurality of training images.

21. A device as recited in claim 17, wherein the instructions for evaluating the features further comprise instructions for generating, by a plurality of support vector machines, the training image feature orientation classification models using a plurality of training images.

22. A device as recited in claim 17, wherein the features comprise color moment and structural features, and wherein the instructions for evaluating the features further comprise instructions for:
classifying, by a first plurality of classifiers, orientations of the color moment features with respect to each of a plurality of orientations to generate respective color moment confidence values for each orientation;
evaluating, by the first classifiers, orientations of the structural features with respect to each orientation to generate respective structural confidence values for each orientation;
for each orientation, combining, by a second plurality of classifiers, the color moment and structural confidence values that correspond to the orientation to generate a respective image orientation confidence value that corresponds to the orientation; and
wherein the orientation is based on the respective image orientation confidence values.

23. A device as recited in claim 22, wherein combining the color moment and structural confidence values further comprises combining the color moment and structural confidence values with a static classifier.

24. A device as recited in claim 22, wherein combining the color moment and structural confidence values further comprises combining the color moment and structural confidence values with a hierarchically trainable classifier.

25. A device to identify an image orientation, the device comprising processing means for:
   extracting features from a periphery of an image;
   evaluating the features based on training image feature orientation classification models; and
   responsive to evaluating the features, identifying an orientation of the image.

26. A device as recited in claim 25, wherein the features comprise chrominance and luminance features.

27. A device as recited in claim 25, wherein the means for evaluating the features further comprise means for:
   evaluating the orientation to determine a level of confidence in the orientation; and
   determining that the orientation is correct or incorrect based on the level of confidence.

28. A device as recited in claim 25, wherein the means for evaluating the features further comprise means for generating the training image feature orientation classification models using a plurality of training images.

29. A device as recited in claim 25, wherein the features comprise color moment and structural features, and wherein the means for evaluating the features further comprise means for:
   classifying orientations of the color moment features with respect to each of a plurality of orientations to generate respective color moment confidence values for each orientation;
   evaluating orientations of the structural features with respect to each orientation to generate respective structural confidence values for each orientation;
   for each orientation, combining the color moment and structural confidence values that correspond to the orientation to generate a respective image orientation confidence value that corresponds to the orientation; and
   wherein the orientation is based on the respective image orientation confidence values.

30. A device as recited in claim 29, wherein the means for combining the color moment and structural confidence values the color moment and structural confidence values further comprises means for combining the color moment and structural confidence values with a static classifier.

31. A device as recited in claim 29, wherein the means for combining values the color moment and structural confidence values further comprises means for combining the color moment and structural confidence values with a hierarchically trainable classifier.

32. A method to identify a correct image orientation, the method comprising:
   dividing an image into a plurality of blocks comprising peripheral blocks and non-peripheral blocks;
   extracting low-level content from the peripheral blocks, the content comprising chrominance and luminance features;
   classifying orientations of the chrominance features with respect to each of a plurality of orientations to generate respective chrominance confidence values for each orientation;
   evaluating orientations of the luminance features with respect to each orientation to generate respective luminance confidence values for each orientation;
   for each orientation, combining the chrominance and luminance confidence values that correspond to the orientation to generate a respective image orientation confidence value that corresponds to the orientation; and
   identifying the correct image orientation based on the respective image orientation confidence values.

33. A method as recited in claim 32, wherein the chrominance features comprise color moments and wherein the luminance features comprise structural features.

34. A method as recited in claim 32, wherein classifying orientations of the chrominance features, evaluating orientations of the luminance features, and combining the chrominance and luminance confidence values are performed using statistical analysis learning techniques.

* * * * *